(12) United States Patent
Easton

(10) Patent No.: US 10,810,601 B2
(45) Date of Patent: Oct. 20, 2020

(54) LEGISLATION AWARE SYSTEM

(71) Applicant: International Business Machines Corporation, Armonk, NY (US)

(72) Inventor: John P. Easton, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 14/943,637

(22) Filed: Nov. 17, 2015

(65) Prior Publication Data

US 2017/0140389 A1 May 18, 2017

(51) Int. Cl.
*G06F 16/185* (2019.01)
*G06Q 30/00* (2012.01)
*G06F 16/11* (2019.01)
*G06F 9/48* (2006.01)
*G06F 16/21* (2019.01)

(52) U.S. Cl.
CPC ......... *G06Q 30/018* (2013.01); *G06F 9/4875* (2013.01); *G06F 16/119* (2019.01); *G06F 16/122* (2019.01); *G06F 16/125* (2019.01); *G06F 16/185* (2019.01); *G06F 16/214* (2019.01)

(58) Field of Classification Search
None
See application file for complete search history.

(56) References Cited

U.S. PATENT DOCUMENTS

| | | | |
|---|---|---|---|
| 8,396,838 B2 | 3/2013 | Brockway et al. | |
| 8,782,762 B2 | 7/2014 | Krishnan et al. | |
| 2011/0004632 A1* | 1/2011 | Martino | G06Q 10/06 707/802 |
| 2011/0022642 A1* | 1/2011 | deMilo | G06F 17/30082 707/805 |
| 2012/0303776 A1* | 11/2012 | Ferris | G06F 9/5072 709/223 |
| 2013/0132457 A1* | 5/2013 | Diwakar | G06F 9/5072 709/201 |
| 2014/0026179 A1 | 1/2014 | Devarajan et al. | |
| 2014/0351606 A1 | 11/2014 | Demilo et al. | |

OTHER PUBLICATIONS

Alsudiari et al., Cloud Computing and Privacy Regulations: An Exploratory Study on Issues and Implications, Advanced Computing: An International Journal (ACIJ) vol. 3, No. 2, Mar. 2012, pp. 159-169.

(Continued)

*Primary Examiner* — Jan P Mincarelli
(74) *Attorney, Agent, or Firm* — Schmeiser, Olsen & Watts, LLP; Stephanie Carusillo

(57) ABSTRACT

A method and associated computer system and computer program product. A set of legal compliance rules associated with a service is identified. A service provider with associated service provider characteristics is identified. The service provider is capable of providing the service. Compliance or non-compliance of the legal compliance rules with the service provider characteristics is verified using service characteristics of a default service. A compliant or non-compliant verification of the service provider for the default service is returned from a result of the verifying compliance or non-compliance.

17 Claims, 10 Drawing Sheets

(56) References Cited

OTHER PUBLICATIONS

Ristov et al., A New Methodology for Security Evaluation in Cloud Computing, MIPRO 2012, May 21-25, 2012, Opatija, Croatia, pp. 1484-1489.
Belgium-Brussels: Digit/R2/PO/2014/043 cloud services 2015/S 053-091747, Corrigendum, (Supplement to the Official Journal of the European Union, Dec. 27, 2014, 2014/S 249-440399)Services—91747-2015—TED Tenders Electronic Daily http://ted.europa.eu/udl?uri=TED:NOTICE:091747-2015:TEXT:EN:HTML, 1 page, Retrievied on Jul. 18, 2016.
Services—29747-2015—TED Tenders Electronic Daily http://ted.europa.eu/udl?uri=TED:NOTICE:029747-2015:TEXT:EN:HTML, Jan. 28, 2015 S19 European Commission—Services—Additional information—Open procedure Belgium-Brussels: DIGIT/R2/PO/2014/043 cloud services, 2015/S 019-029747, Corrigendum (Supplement to the Official Journal of the European Union, Dec. 27, 2014, 2014/S 249-440399), 1 page, Retrieved on Jul. 18, 2016.
Services—65713-2015—TED Tenders Electronic Daily http://ted.europa.eu/udl?uri=TED:NOTICE:065713-2015:TEXT:EN:HTML, Feb. 25, 2015 S39 European Commission—Services—Additional information—Open procedure Belgium-Brussels: DIGIT/R2/PO/2014/043 cloud services, 2015/S 039-065713, Corrigendum (Supplement to the Official Journal of the European Union, Dec. 27, 2014, 2014/S 249-440399), 1 page, Retrieved on Jul. 18, 2016.
Services—440399-2014—TED Tenders Electronic Daily http://ted.europa.eu/udl?uri=TED:NOTICE:440399-2014:TEXT:EN:HTML, Dec. 27, 2014 S249 European Commission—Services—Contract notice—Open procedure I.II.III.IV.VI., Belgium-Brussels: DIGIT/R2/PO/2014/043 cloud services, 2014/S 249-440399, Contract notice Services, Directive 2004/18/EC, 7 pages, Retrieved on Jul. 18, 2016.

\* cited by examiner

LEGISLATION AWARE SYSTEM

TECHNICAL FIELD

The present invention relates to a method and apparatus for a legislation aware system.

BACKGROUND

In order to be able to use a storage service, a user needs to be able to make an assessment of whether the storage service meets the legislative compliance rules associated with the data being stored. Different types of data have different attributes that govern various aspects of their storage, which adds to the complexity of the assessment. The complexity of the assessment also increases with every different type of rule based system of which legislation is one type. This assessment is complex, requiring significant understanding on behalf of the user. If services are to achieve the widest possible adoption, then problems such as this need to be solved in such a way as to hide as much of the complexity from the user as possible.

SUMMARY

A method and associated computer system and computer program product. One or more processors of the computer system identify a set of legal compliance rules associated with a service. The one or more processors identify a service provider with associated service provider characteristics, the service provider capable of providing the service. The one or more processors verify compliance or non-compliance of the legal compliance rules with the service provider characteristics using service characteristics of a default service. The one or more processors return, from a result of the verifying, a compliant or non-compliant verification of the service provider for the default service.

BRIEF DESCRIPTION OF THE DRAWINGS

Embodiments of the present invention will now be described, by way of example only, with reference to the following drawings.

DETAILED DESCRIPTION

Figure 1:
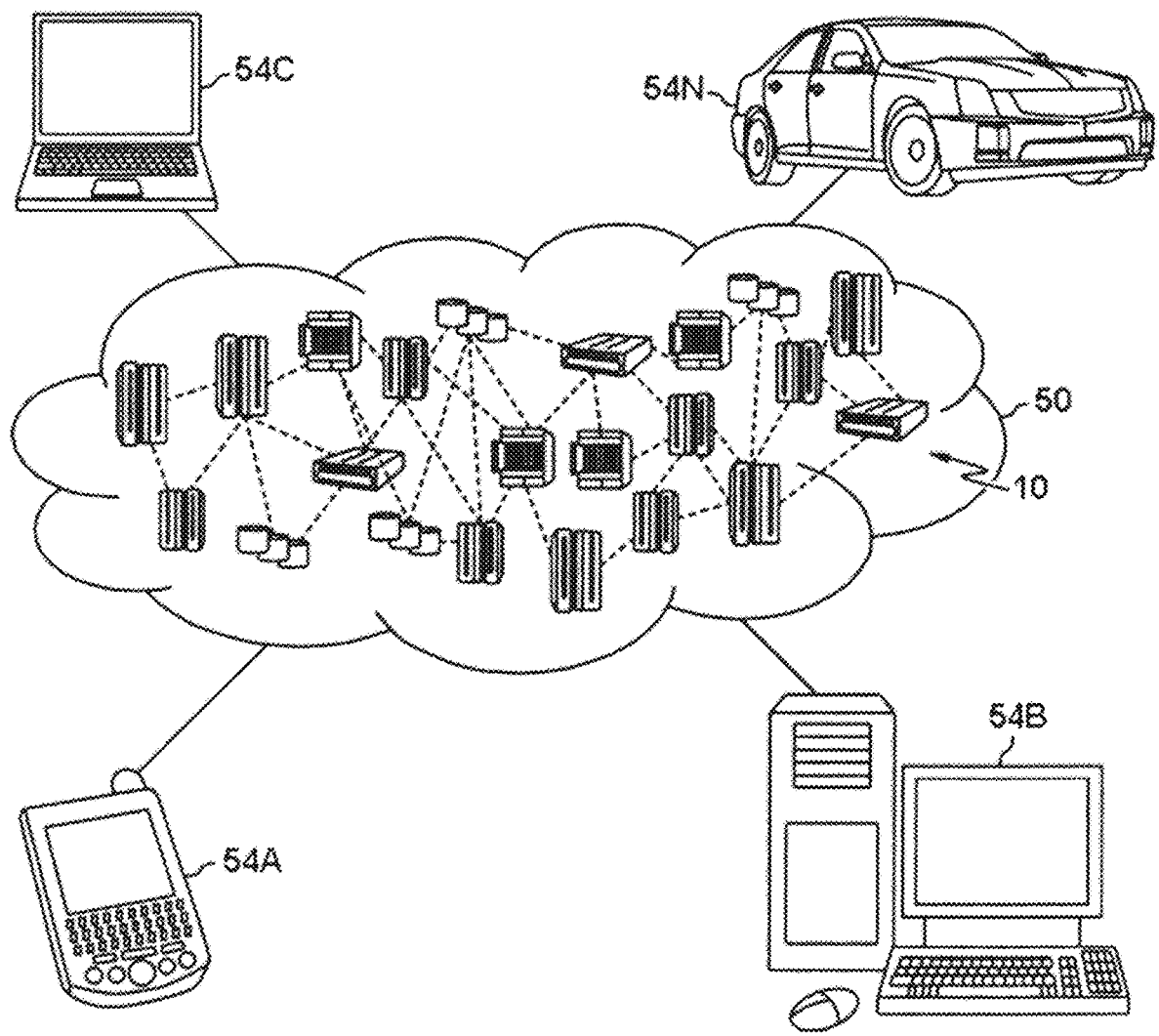
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource usage by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2A:
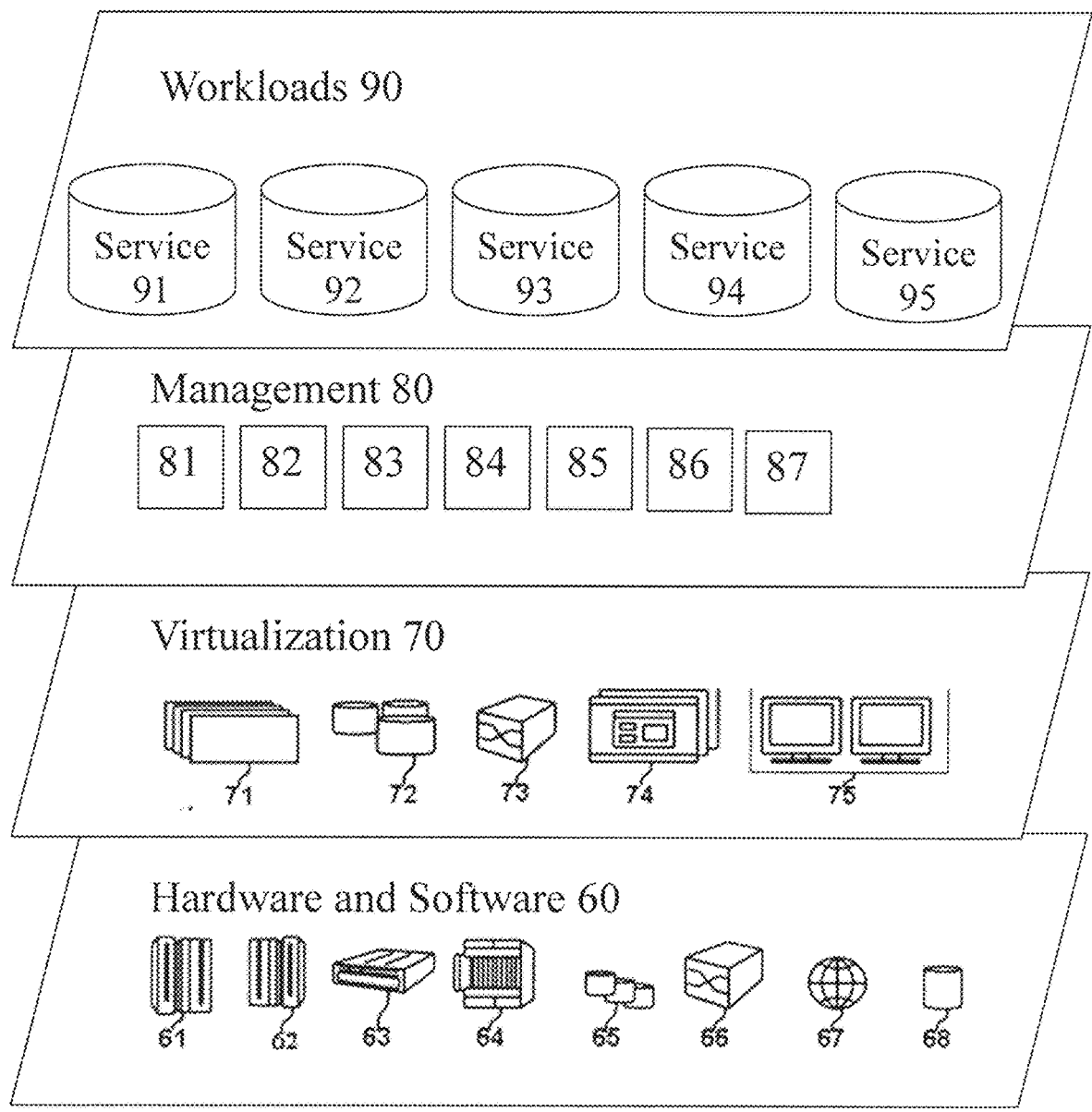
FIG. 2A depicts abstraction model layers according to an embodiment of the present invention.

Referring now to FIG. 2A, a set of functional abstraction model layers provided by cloud computing environment 50 (FIG. 1) is shown. It should be understood that the components, layers, and functions shown in FIG. 2A are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Legislation Aware System 86 provides the functionality of embodiments of the present invention and is explained in more detail with respect to FIGS. 2B and 2C. Legal compliance rule server 87 is an optional management component of embodiments of the present invention.

Workloads layer 90 provides service examples of functionality for which the cloud computing environment may be utilized. Examples of workloads and functions which may be provided from workloads layer 90 include: mapping and navigation service 91; software development and lifecycle management service 92; virtual classroom education delivery service 93; data analytics processing service 94; and transaction processing service 95.

Figure 2B:
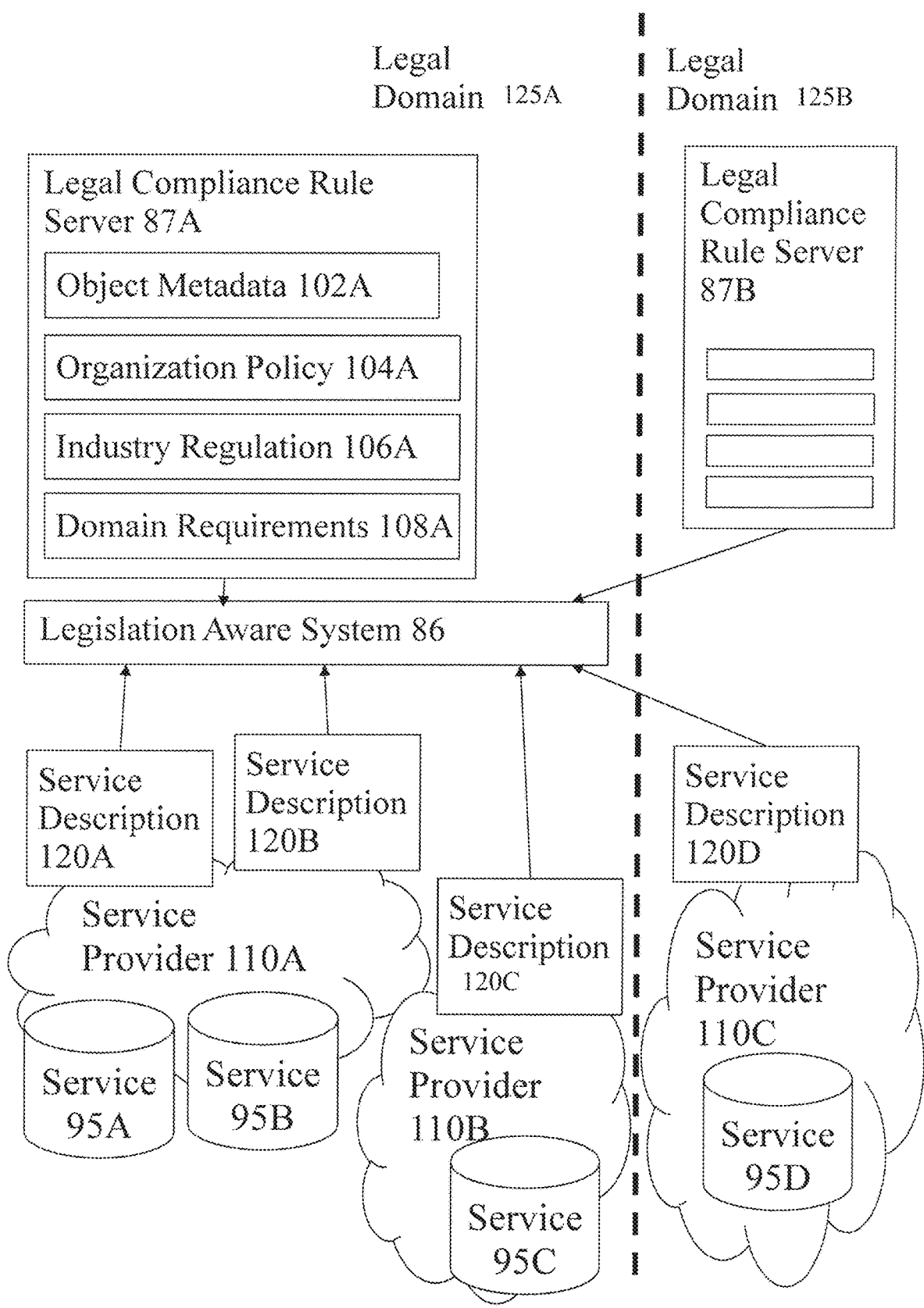
FIG. 2B depicts an example deployment diagram of a network of service providers across legal domains, in accordance with embodiments of the present invention.

FIG. 2B depicts an example deployment diagram of a network of service providers across legal domains, in accordance with embodiments of the present invention. In FIG. 2B, an example legislation aware system 86 is in a network of legal compliance rule servers (87A, 87B) and service providers (110A, 110B, 110C) that populate legal domain 125A and legal domain 125B. This example in FIG. 2B is described in terms of discrete components in a cloud based environment spread over several legal domains. A legal domain is generally a physical area such as a country or region of countries (for example the USA). Two legal domains 125A and 125B are shown in this example but any number of domains can be considered. In this example, each legal domain has a corresponding legal compliance rule server. In other examples, a single legal compliance rule server could hold all the rules for all the legal domains, or a small number of rule servers could hold the rules for a larger number of legal domains. Legal compliance rule server 87A, legislation aware system 86, service provider 110A and service provider 110B are all located in legal domain 125A. A legal domain could also be an association or standard to which the service provider belongs. Legal domain 125B (for example, Europe) is a different country or region than legal domain 125A and includes legal compliance rule server 87B and service provider 110C. Legal compliance rule server 87A collects and serves legal compliance rules of the particular legal domain 125A in this example, but as long as the legal compliance rules are clearly referenced for a particular legal domain, the location of the rule servers is not important. In this example, the server provider 110A in legal domain 125A can provide two services 95A and 95B along with their associated service descriptions 120A and 120B. Service provider 110B in legal domain 125A can provide service 95C and associated service description 120C. Service provider 110C in legal domain 125B can provide service 95D and associated service description 120D. Each service provider 110A, 110B, 110C can also provide respective service provider characteristics (not shown).

In order to be able to use a cloud storage service, a user needs to be able to assess how well the service and service provider will meet one or more legislative compliance rules (LCRs) associated with the data object being used in the service by the service provider. In one embodiment, the service provider is a physical computer in a fixed location, and the user may be unaware of where the fixed location is, but needs to be aware that the service provider is compliant with the relevant LCRs.

An LCR includes: type and format of data being used or stored (for example, personal data relevant to data privacy rules); physical locality within a specific legal jurisdiction relevant to security rules; how long the data needs to be kept; whether data needs to be encrypted or not (relevant to security if the data is confidential); and what other individuals, organizations or authorities might have access to the data and under what circumstances.

LCR server 87A includes: rules regarding object metadata 102A; rules relating to organizational policy 104A; rules relating to industrial regulation 106A; and rules relating to domain requirements 108A. Any one or more of the preceding rules in LCR server 87A can be part of an LCR. An example of an object metadata 102A rule is a rule that might stipulate that data objects of a certain type must conform to a certain naming convention. An example of a rule relating to organizational policy 104A is a constraint that a group of data must have a minimum or maximum number of group members. An example of a rule relating to an industrial regulation 106A is that certain data must be verified periodically. An example of a rule relating to domain requirements 108A is a constraint that the domain must be only certain predefined or specified domains. LCR server 87B may include similar or other rules.

Legislation Aware System (LAS) 86 may match legislative compliance rules (LCRs) that need to be met for the successful service provision (as defined by a service definition (SD)) against service provider characteristics (SPC) (such as location and platform security) of one or more service providers. As such, LAS 86 takes an LCR (such as data locality or sovereignty); expresses the LCR in a machine format; stores the LCR in a searchable repository; and matches the LCR against service provider and service definitions. As laws change, LCRs and their definitions are also updated. Service providers express their SPCs in a machine form compatible with the LCR.

LAS 86 abstracts underlying cloud storage providers from potential users of the service to hide functional complexity while offering a set of features to assure users that the users' data is being kept and serviced in a compliant manner according to the relevant legislation. Normally a user of a cloud service does not know where the service provided is located, but the user may want to know if the service is being run by a service provider in accordance to the rules in the locality of the service provider.

LAS 86 provides for offering the services of multiple cloud providers operating in the different member states across a region (for example the USA or Europe) to potential clients or cloud service consumers across that region. LAS 86 facilitates the operation of cross-border services and thus drives growth of pan-region cloud services.

Each service provider keeps service definitions (SD) for each service that describes the attributes of each service offered. Each SD includes: a location identifier as to where data is physically stored; a value representing how often the SD backs up its data; an indicator as to whether and where disaster recovery is provided; an indicator as to the type of encryption used within the services; and an indicator as to whether long-term storage of data is available and for how long.

The constraints on a given data object are likely to arise from different sources; for example, the type of data being stored (healthcare data, local government data, police data); rules placed on the data by the organization within which the data originates; rules placed on the data by the country or state or municipality where the organization operates; and rules placed on that type of data by the region.

Some of these constraints may supersede others, but what results from an initial calculation is the set of all constraints that need to be met in order to support the storage of data in a legislation-aware manner.

This set of constraints is passed to the LAS 86 where a match for a storage service that provides facilities to meet these constraints is searched for. The search for potential storage services may return a number of possible results: no match was found (there is no service available that meets these constraints); a single match is found (there is one service that meets these constraints); or multiple matches are found (there are multiple services that meet these constraints). This provides a set of services from which the user can select their choice.

Data attributes are not the only factors influencing the choice of a given cloud storage service. Other business considerations such as the organizational policies or the cost-effectiveness of the solution also have a role to play in the decision-making process. Thus, it might be expected: (i) that if two cloud storage services both meet the legislative requirements for the type of data being stored that in the absence of any other differentiating factors, cost alone might cause one to be chosen over another or (ii) that should a cheaper but otherwise equivalent provider start offering compliant storage services, a user might choose to move the user's data between providers to take advantage of that lowest price charged by the cheaper but otherwise equivalent provider.

Figure 2C:
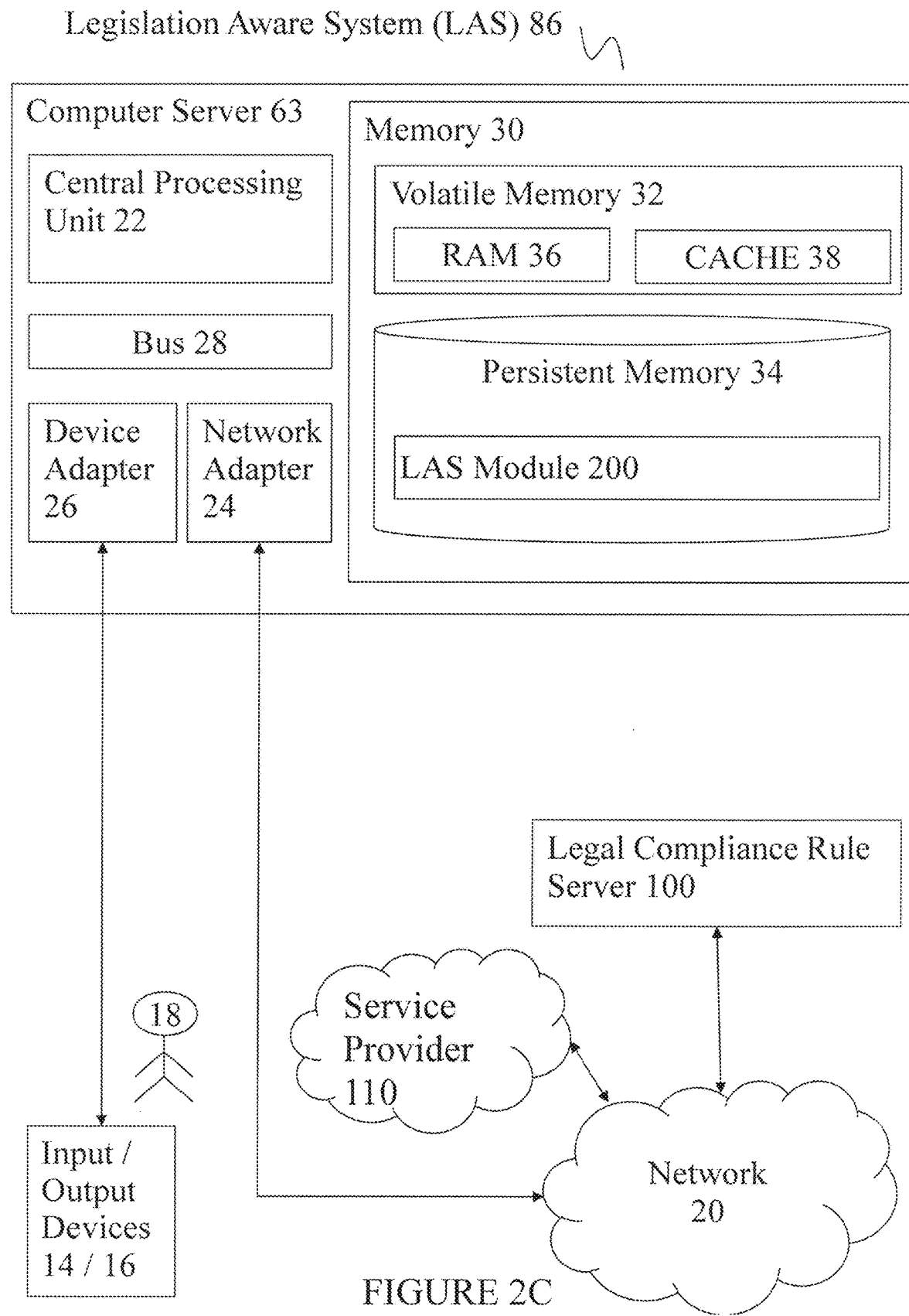
FIG. 2C is a computer system deployment of a legislation aware system in FIG. 2B, in accordance with embodiments of the present invention.

FIG. 2C is a computer system deployment of the legislation aware system 86 in FIG. 2B, in accordance with embodiments of the present invention. The computer system in FIG. 2C is embodied by a computer server, such as cloud computing node 10, in a distributed cloud computing environment, such as cloud computing environment 50, where tasks are performed by remote processing devices that are linked through a communications network. In a distributed cloud computing environment, program modules may be located in both local and remote computer system storage media including memory storage devices. Legislation aware system 86 is operational with numerous other general purpose or special purpose computing system environments or configurations. Examples of well-known computing processing systems, environments, and/or configurations that may be suitable for use with legislation aware system 86 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of Things computing environment, for example, where computer processing systems are distributed as a network of objects that can interact with a computing service.

Legislation aware system 86 may be described in the general context of computer system executable instructions, such as program modules, being executed by a computer processor. Generally, program modules may include: routines; programs; objects; components; logic; and data structures that perform particular tasks or implement particular abstract data types.

Legislation aware system 86 includes: general purpose computer server 63 and one or more input devices 14 and output devices 16 directly attached to the computer server 63. Legislation aware system 86 is connected to a network 20. Legislation aware system 86 communicates with a user 18 using input devices 14 and output devices 16. Input devices 14 include one or more of: a keyboard; a scanner; and a mouse, trackball or another pointing device. Output devices 16 include one or more of a display or a printer. Legislation aware system 86 communicates with network devices (not shown) over network 20. Network 20 can be a local area network (LAN), a wide area network (WAN), or the Internet.

Computer server 63 includes: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 63 and network devices such as service provider 110 and legal compliance rule server 100.

Device adapter 26 is connected to bus 28 and input devices 14 and output devices 16 for enabling communication between computer server 63 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because volatile memory is faster than non-volatile or persistent memory, and generally non-volatile or persistent memory is used because non-volatile or persistent memory will hold the data for longer amounts of time than volatile memory. Legislation aware system 86 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

A program module configured to carry out the functions of one embodiment includes module legislation aware system (LAS) module 200. In one embodiment, ROM in the memory 30 stores LAS module 200 that enables the computer server 63 to function as a special purpose computer specific to the LAS module 200. Further program modules that support the embodiments of the present invention but are not shown include firmware, boot strap program, operating system, and support applications. Each of the operating system; support applications; other program modules; and program data; or some combination thereof; may include an implementation of a networking environment.

Legislation aware system 86 communicates with at least one network 20 (such as a local area network (LAN), a general wide area network (WAN), and/or a public network like the Internet) via network adapter 24. Network adapter 24 communicates with the other components of computer server 63 via bus 28. It should be understood that although not shown, other hardware and/or software components could be used in conjunction with legislation aware system 86. Examples, include, but are not limited to: microcode, device drivers, redundant processing units, external disk drive arrays, redundant array of independent disks (RAID), tape drives, and data archival storage systems.

Although the computer system depicted in FIG. 2C has been described with respect to the legislation aware system 86, the computer system depicted in FIG. 2C can be used to implement any method or functionality of the present invention that is capable of being implemented by computerization.

Figure 3:
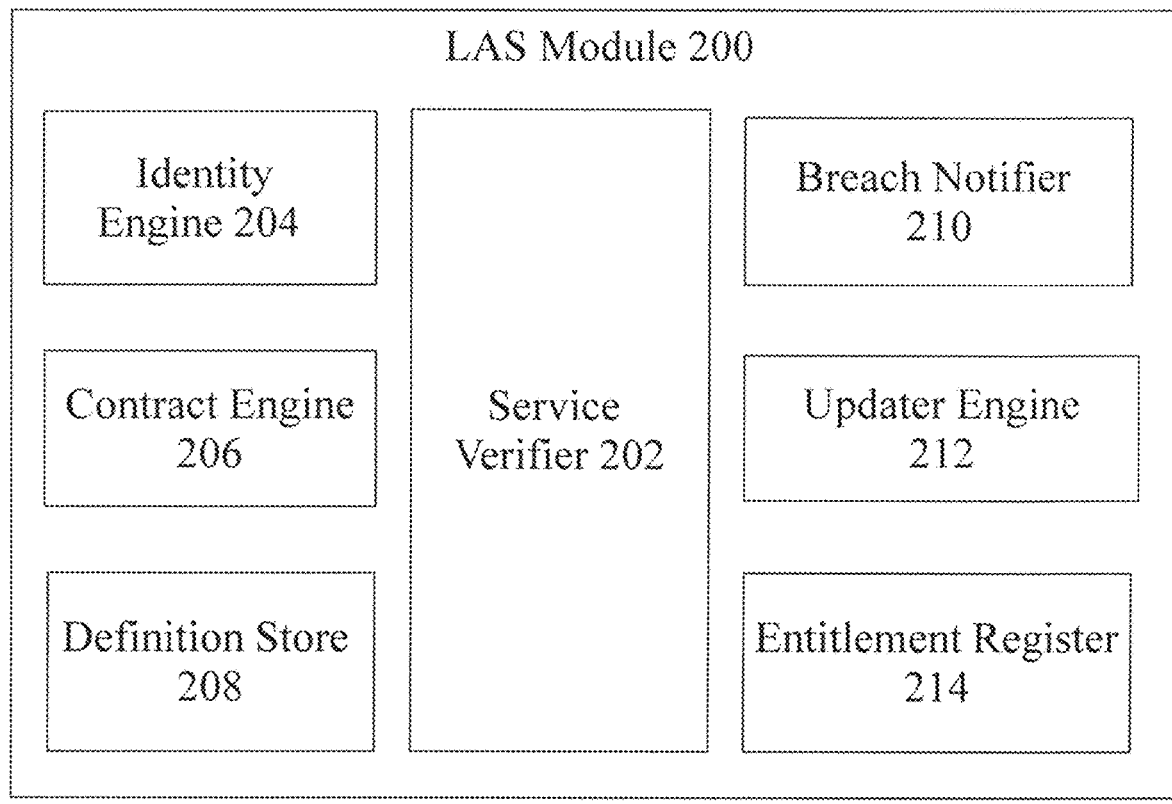
FIG. 3 is a component diagram of a legislation aware system (LAS) module in FIG. 2C, in accordance with embodiments of the present invention.

FIG. 3 is a component diagram of the LAS module 200 in FIG. 2C, in accordance with embodiments of the present invention. The LAS module 200 includes: a service verifier 202; an identity engine 204; a contract engine 206; a definition store 208; a breach notifier 210; an updater engine 212; and an entitlement register 214.

Service verifier 202 is for allowing a user to determine if one or more service providers (as defined by the SPC) are able to meet a set LCRs for service and storage of all data types without looking at the individual types of data and hence choose a provider that allows the user to meet the user's legal requirements. For instance, an LCR might state that a compliant service would only store personal data in Europe. The service verifier 202 does not look at the data type of the service, but only looks at service providers that store all data in Europe regardless of the type of data. Service verifier 202 is also for verifying that a service (as defined by the SD or by the service operational steps) at a data type level can be performed by a service provider (as defined by the SPC) in accordance with current legal practice. Service verifier 202 does not need to evaluate the service definition if an assumption is made that all processing and storage is performed by the service provider at the service provider location. However, service verifier 202 can look more closely at the service definition to evaluate any special service definition as to where the data is operated on or stored. Moreover, service verifier 202 can look at the service operational instructions to evaluate any service definition as to where the data is operated on or stored. Service verifier 202 is described in more detail below.

Identity engine 204 is for registering the identity and location of the service providers and respective services. Identity engine 204 is also for registering service provider characteristics for each service provider. Existing and new cloud providers that wish to participate in the solution need to notify the LAS of the services that the existing and new cloud providers provide and the legislative standards that the existing and new cloud providers meet. Each provider registers the provider's identity in the identity register 204 and stores associated service definitions in the definition store 208. The services are provided to the LAS via a standard 'definition' similar to an electronic form that the service provider fills to documents specific attributes of the service. A user wishing to verify that a service will store data in a compliant manner needs to supply the LAS with a set of LCRs for evaluation against the service, data and location.

Contract engine 206 is for determining whether a SD or an SPC is self-assessed by the provider to meet the requirement or whether this SD or SPC has been verified or assessed by a 3rd party. If assessed by a 3rd party, the name and credentials of the 3rd party will be stored.

Definition store 208 is for storing service definitions and contract definitions.

Breach notifier 210 is for notifying a user when an LCR changes causing a service executing on a service provider to be in breach of a legal requirement. The storage services provided and legislative compliance rules are likely to change over time. For example, when new legislation is introduced, a cloud provider may take a period of time during which the services offered are non-compliant with the new legislation. The service definition can be updated to reflect this non-compliance or keep a separate record of each service and its compliance or non-compliance status. In response to compliance being achieved, the status is updated once again. The updater service polls or queries the service providers and services if required. Timestamps are used to ensure that the LAS 86 is aware whether a service has been updated following any change. All updated service definitions are placed in the definition store 208.

Updater engine 212 is for keeping the service definitions and contracts current. At any time, a query can be run to ascertain whether data is being stored in a service which is compliant with the current legislative (and other) constraints required for data of a same type as the data being stored in the service.

Entitlement register 214 is for identifying and authenticating users and service provides. Identification is performed externally to the LAS 86 and can be performed via a unique, standardised identification mechanism or via a proxy that consolidates identities (for example, an organisation's directory service). In response to suitable authentication, a unique entitlement to use services, for example access specific data objects, will be granted or denied based upon a set of permissions specific to a particular data object, data container, or data domain. These permissions can be regarded as analogous to a permission structure of a standard file system, but will be managed through an access control list structure to provide finer grained control.

Entitlement register 214 is configured to grant a unique token which can be used to gain access to the underlying cloud storage service. Users cannot access the data directly without this token being granted. A token has a finite lifetime and is subsequently revoked. All token granting and revocation and the associated user, organization and the organization's data operations are reliably logged for audit and data protection purposes.

A properly authenticated user from an external government agency, for example law enforcement, may be able to change the entitlement of a user or organization, for example to place a legal hold on a set of data/prevent movement (copy out) or deletion of the set of data. This 'override' will need to be properly authorized by suitable bodies (for example if a warrant needs to be obtained from a court or similar legal body) and will not be generally available to a normal user of the system.

Capabilities such as the provision of specific levels of encryption (for example, long-term storage) are factors by which the underlying cloud storage service providers may differentiate one another. It is assumed that there will be differences between the services that LAS 86 abstracts and that these services allow cloud storage service providers to differentiate their offerings from those of other providers. While these attributes are declared in the definition of the service and are used in the service matching process, these attributes are treated alongside other data constraints in the selection process. LAS 86 does not enforce that a given encryption technology is used or whether a given long term storage technology is appropriate. The responsibility for this enforcement remains with each service provider.

Figure 4:
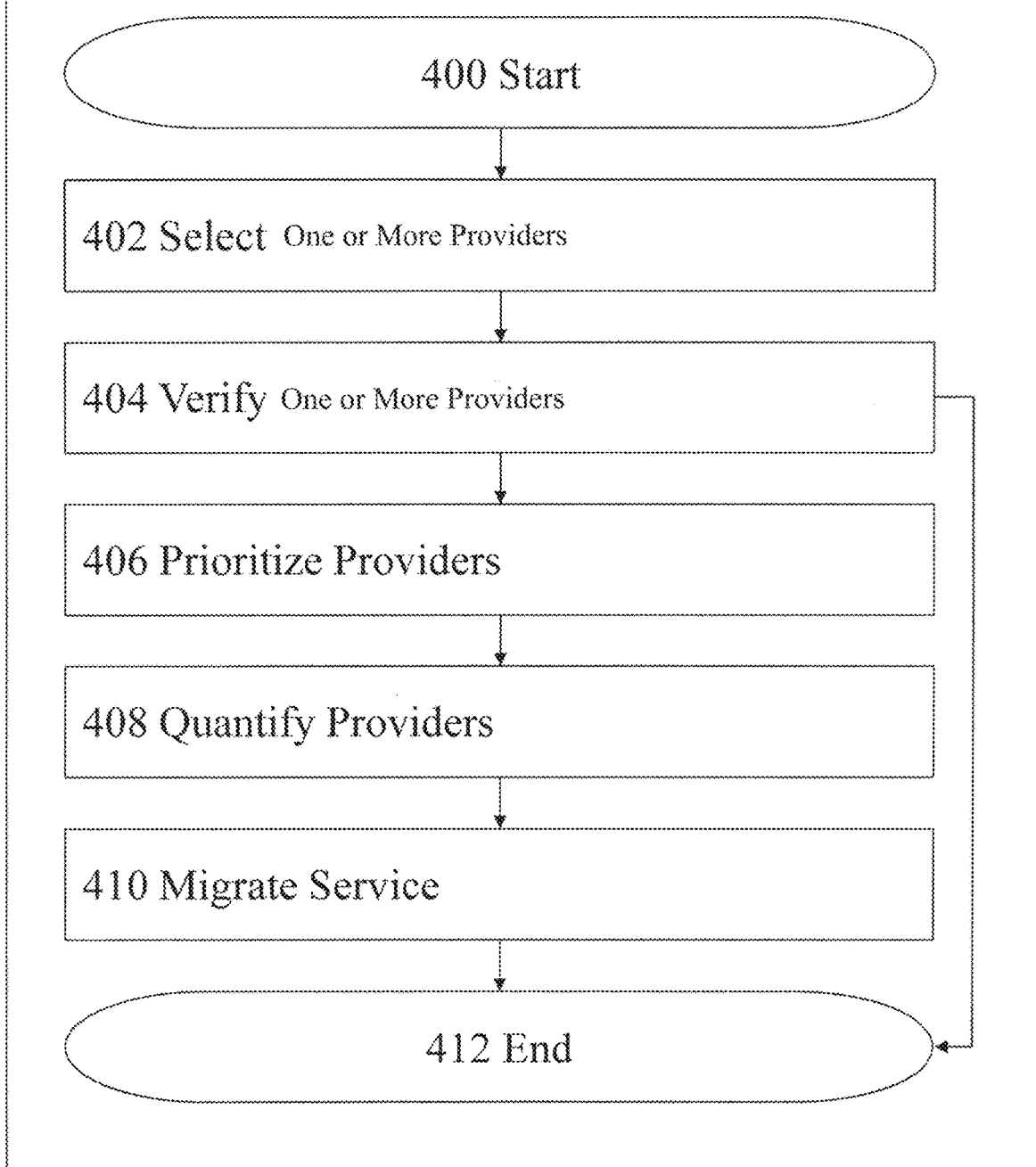
FIG. 4 is a flow diagram of a service verifier in FIG. 3, in accordance with embodiments of the present invention.

FIG. 4 is a flow diagram of the service verifier 202 in FIG. 3, in accordance with embodiments of the present invention. The service verifier 202 includes logical process steps 400 to 412.

Step 400 is for starting the method when a user requests that one or more providers and/or one or more services be verified or when an event such as a rule change prompts a reselection and verification of a service.

Step 402 is for selecting service providers that might comply with a set of LCRs for a given service or services as identified by a user or from a directory list or some other stored list or index. For a given service, there will typically be more than one service provider that provides the service, and the identities of the selected service providers will be stored with identity engine 204 as a directory.

Step 404 is for verifying each service provider from the selected service providers group. Each service provider is tested to see if the service provider complies with the identified LCRs, and a further group of verified services and service providers is compiled. The identities of each verified service provider is stored in the identity engine 204. Step 404 is described in more detail as step 404A in FIG. 5A in a first embodiment, as is step 404B in FIG. 5B in a second embodiment. If only a single service and service provider is verified, then step 406, step 408 and step 410 are not used and the service verifying ends.

Step 406 is for prioritizing two or more service provider services according to a priority policy when two or more service provider services are compliant with the LCRs. Any policy type can be applied to prioritize the verified service provider services typically involving a user requirement. For example, a policy to use the lowest cost provider allows the user to receive a list of services prioritized by cost or a policy to use the fastest service providers.

Step 408 is for quantifying two or more service providers according to resource impact. In response to a determination that two or more functionally equivalent service providers meet the legislative requirements of the data and cannot be differentiated by priority policy, a quantify operation is undertaken to compare resource impact of a service on the service provider. For instance, one service provider might have a higher availability of resource to contribute to the service. The resource compared is one or more of: data volume used; processing time; processing resource available; or network bandwidth.

Step 410 is for migrating a service from a first service provider to a second service provider in response to a determination that the first service provider no longer complies with the identified set of LCRs and the second service provider having the highest priority does comply. The second service provider is the highest priority service provider from a group of still verified service providers from step 408 and/or the second service provider has the highest quantification value from step 408. Consider the case where an organization or individual has stored data with one cloud provider who has subsequently been identified (through periodic polling or because legislation has changed) to no longer be compliant with the rules associated with the data stored. The migrate step 410 provides a capability: to identify what data is no longer compliant with the regulation(s); to suggest alternative compliant storage locations; and also to migrate that data from one provider to another provider should that need arise. Step 410 is also for migrating to a service currently running on a first service provider to a second service provider in response to a determination that the second service provider has a higher priority or a higher quantification value than the first service provider. Optionally migration resource cost is taken into account when deciding whether to migrate. A limit on the number of times a service is migrated in a period of time is enabled in one embodiment to stop excessive and disruptive migration.

Step 412 is the end of the service match method.

Figure 5A:
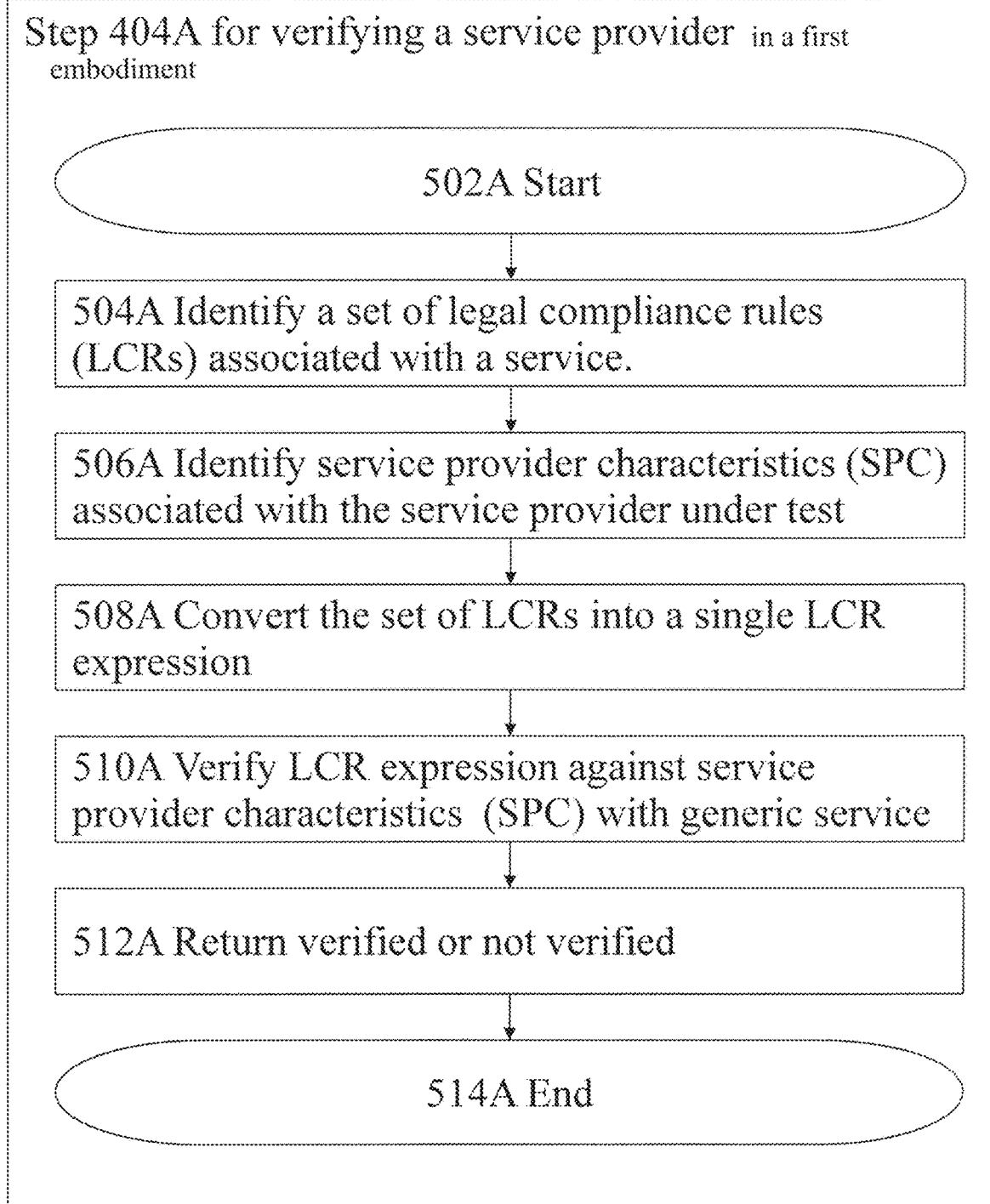
FIG. 5A is a flow diagram of a process of a first embodiment of a step in FIG. 4 for verifying a service provider.

FIG. 5A is a flow diagram of a process of a first embodiment of step 404 in FIG. 4 (denoted as step 404A) for verifying a service provider. The flow diagram of FIG. 5A includes logical process steps 502A to 512A.

Step 502A is the start of the verify provider step 404 when called from service verifier 202.

Step 504A is for identifying a set of LCRs for testing against the service providers and a service. Typically, a call to verify a provider includes a set of LCRs, an associated service and a service provider. Optionally, the call will contact one or more service providers for testing or otherwise LAS 86 will locate service providers that offer the identified service. Some of the registered rules may be dependent on further rules that will need to be retrieved and linked into a full set of LCRs.

Step 506A is for identifying a service provider characteristics (SPC) associated with the service provider under test.

Step 508A is for converting the identified set of LCRs into a single LCR expression.

Step 510A is for verifying the LCR expression against service provider characteristics (SPC) with a generic service.

Step 512A is for returning a verified or not verified result.

Step 514A is the end of step 404.

Figure 5B:
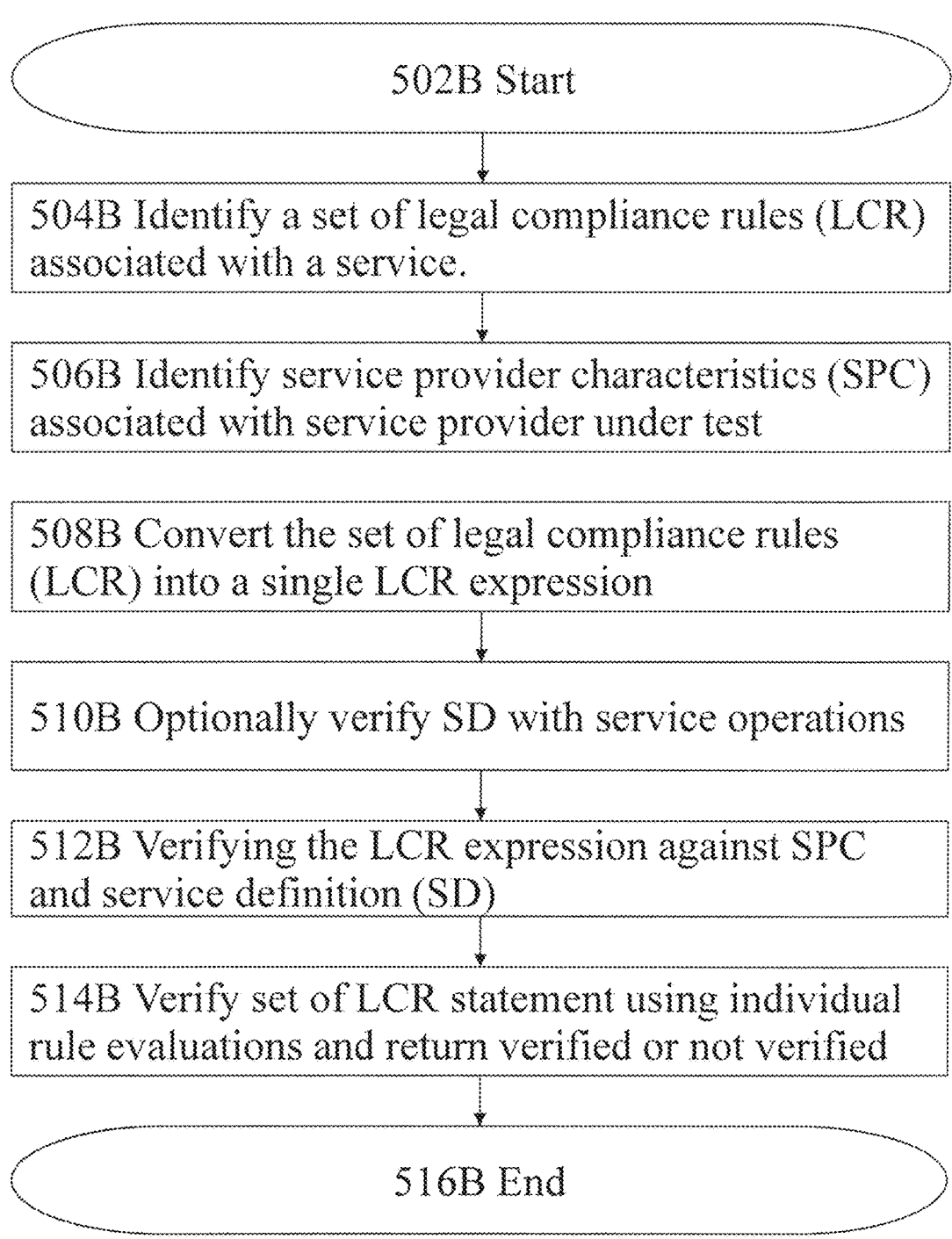
FIG. 5B is a flow diagram of a process of a second embodiment of a step in FIG. 4 for verifying a service provider.

FIG. 5B is a flow diagram of a process of a second embodiment of step 404 in FIG. 4 (denoted as step 404B) for verifying a service provider. The flow diagram of FIG. 5B includes logical process steps 502B to 516B.

Step 502B is the start of the verify provider step 404B when called from service verifier 202.

Step 504B is for identifying a set of LCRs for testing against the service providers and service.

Step 506B is for identifying a service provider characteristics (SPC) associated with service provider under test.

Step 508B is for converting the located set of LCRs into a single LCR expression.

Step 510B is an optional step for verifying the service definition with the service.

Step 512B is for verifying the LCR expression against the SPC of the service provider and the service definition (SD) of the service.

Step 514B is for returning a verified or not verified result.

Step 516B is the end of step 404.

Figure 6A:
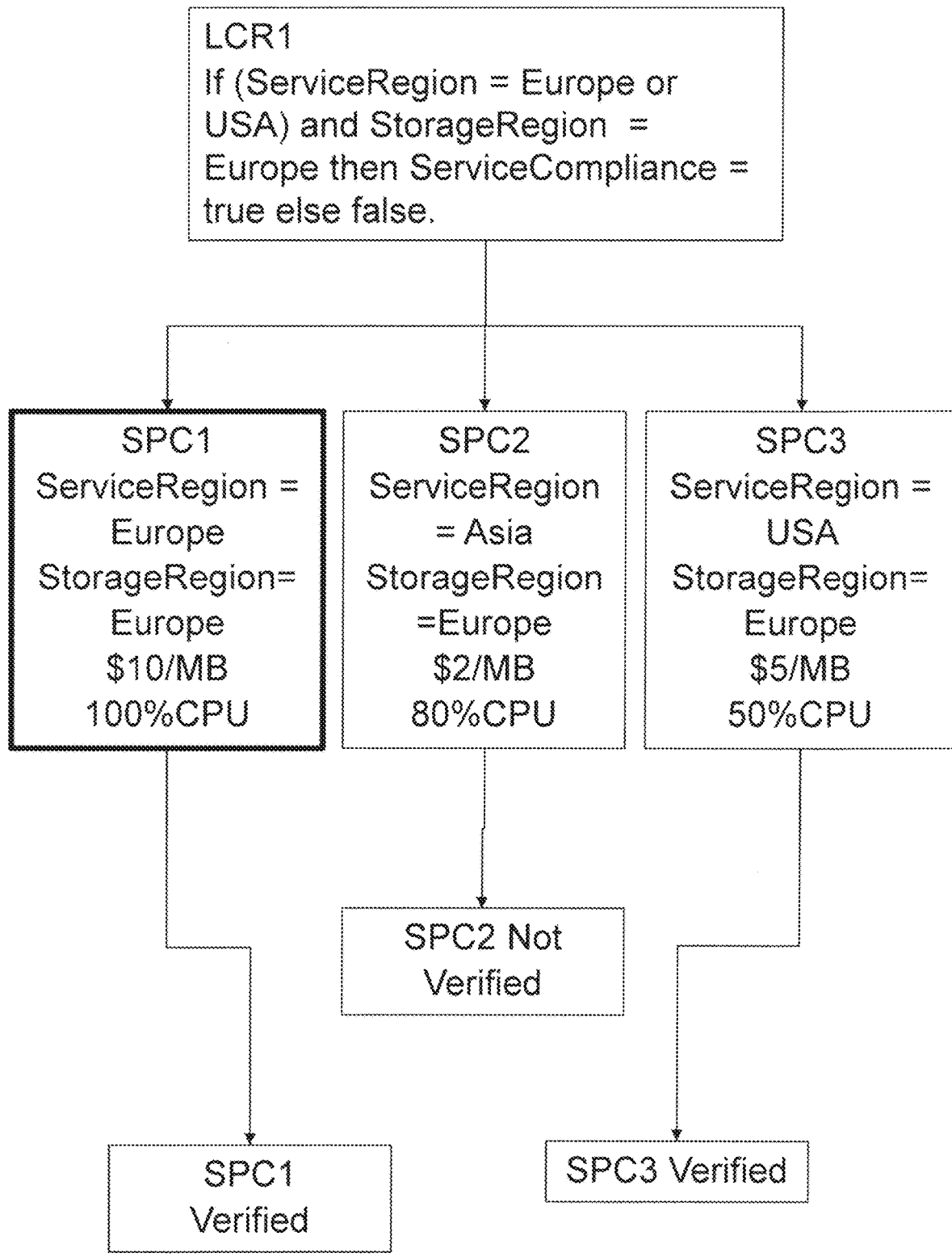
FIGS. 6A, 6B and 6C show an example of an embodiment of the present invention.
Figure 6B:
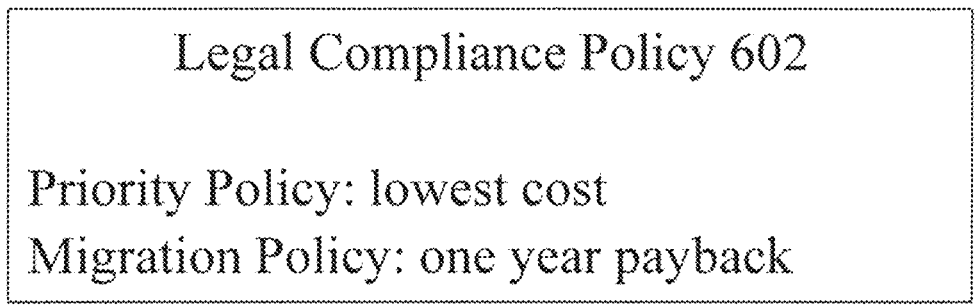
Figure 6C:
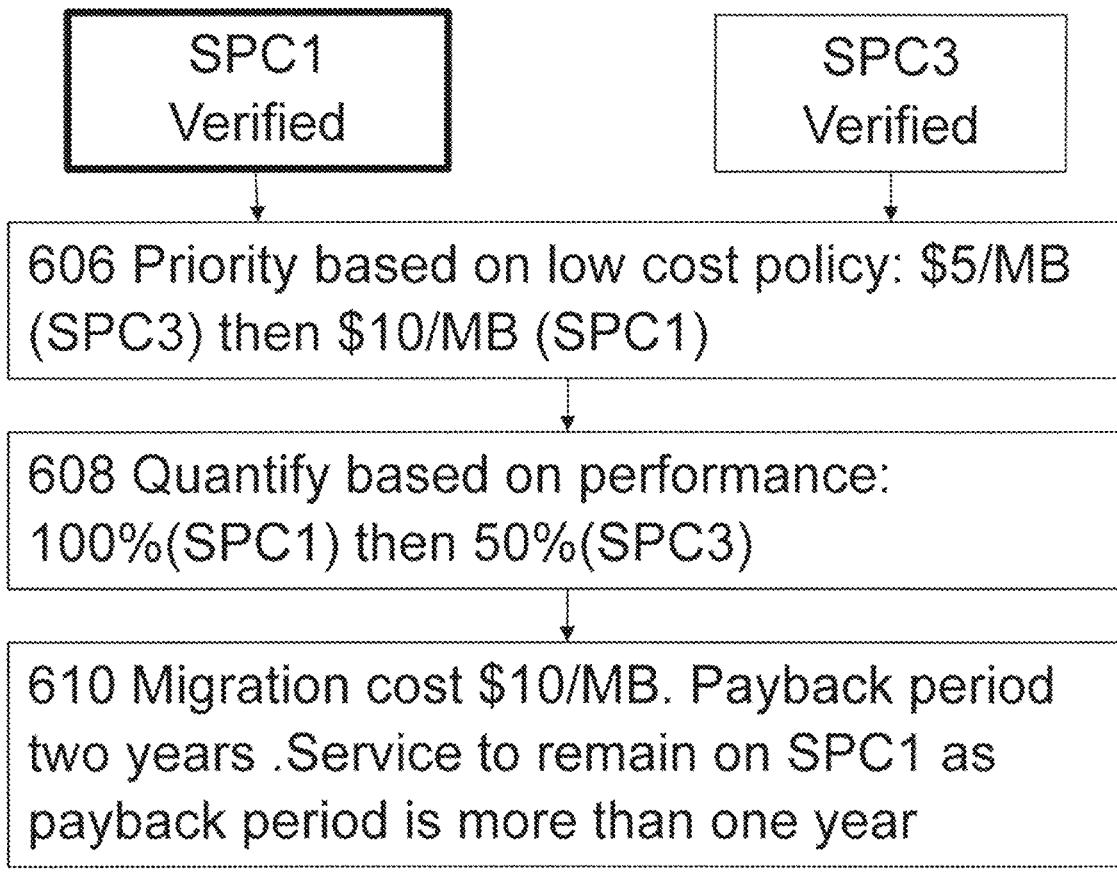

FIGS. 6A, 6B and 6C show an example of an embodiment of the present invention.

Referring to FIG. 6A, a service would be compliant with the legislative requirements if the service were performed with data stored in Europe. Example identified LCRs include:

ServiceRegion=Europe or USA

And

StorageRegion=Europe

These LCRs are converted into a single pseudo code expression LCR1 comprising:

LCR1: If (ServiceRegion=Europe or USA) and StorageRegion=Europe then ServiceCompliance=true (else false).

This single expression has two main constraints: that the service region (the region where the service is performed as specified in a global variable ServiceRegion) is Europe or USA (as specified by the global constant Europe or USA) and that the storage region (the region where the data is stored as specified in a global variable StorageRegion) is Europe (as specified by the same global constant Europe). A global variable in effect is one that is used in the LCR and defined in the SPC.

The present example includes three example SPCs: SPC1; SPC2 and SPC3.

Service provider characteristic SPC1 in Europe includes corresponding pseudo code statements defining the global variables.

SPC1: ServiceRegion=Europe; StorageRegion=Europe; $10/MB; 100% CPU

ServiceRegion is the location of the computer server where the service is presently served from, and in this case, this is somewhere in Europe. StorageRegion is the location of the computer storage where the service data is stored. LCR is complied with because the service is performed in Europe, and the data is stored in Europe (as defined by the service provider). Therefore, the service is compliant. SPC1 defines further characteristics: $10/MB is a cost per MB of the service (in this case the cost is $10); and 100% CPU is a percentage of the central processor unit (CPU) used for the service (in this case there is 100% utilization).

Service provider SPC2 has the following SPC pseudo code statement for an SPC.

SPC2: ServiceRegion=Europe; StorageRegion=Asia; $2/MB; 80% CPU

Hence, SPC2 does not comply with LCR1 because the storage region is Asia and data is stored in Asia, therefore, this service is deemed non-compliant. SPC2 also defines further characteristics: a cost per MB of the service of $2 and a service quality of 80% CPU utilization. But these are not used later in the example because the service is not verified.

Service provider SPC3 includes the following SPC pseudo code statement for an SPC.

SPC3: ServiceRegion=USA; StorageRegion=Europe; $5/MB; 50% CPU

SPC3 complies with LCR1 because the data is stored in Europe. SPC3 also defines further characteristics: a cost per MB of the service of $5 and a service quality of 50% CPU utilization.

Referring to FIG. 6B, an example legal compliance policy 602 includes: a priority policy of choosing the lowest cost and a migration policy of requiring a maximum of one year to payback migration costs.

Referring to FIG. 6C, example step 606 (see also step 406 in FIG. 4) is for prioritizing the verified service providers SPC1 and SPC3 according to the legal compliance policy 602 of lowest cost. In this example, SPC3 has a cost of $5/MB that is lower than the cost of SP1 of $10/MB and therefore SPC3 has the higher priority.

Example step 608 (see also step 408 in FIG. 4) is for quantifying the service based on performance, but since cost is priority according to legal compliance policy 602, this quantification is not used. 100% CPU utilization of SPC1 is more than 50% CPU utilization of SPC3, but this is not taken into consideration this time.

Example step 610 (see also step 410 in FIG. 4) is for deciding to migrate the service or not. A migration cost of $10/MB is used as reference, and payback period of two years calculated based on the cost of $5/MB for the service of SPC3. However, since this payback period is lower than the defined migration policy of one year, no migration takes place. If the migration policy was only one year, then migration of the service from SPC1 to SPC3 would take place.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may include hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may include components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:
1. A method, said method comprising:
identifying, by one or more processors of a computer system, a set of at least two legal compliance rules imposed by a government and associated with a service that uses and stores data, wherein the legal compliance rules include a type and format of the data, a physical locality within a legal jurisdiction relevant to security rules for the data, how long the data needs to be kept, whether or not the data needs to be encrypted, and what individuals, organizations or authorities are permitted access to the data and under what circumstances;
identifying, by the one or more processors, a plurality of physical computers with associated physical computer characteristics, wherein each physical computer comprises a central processing unit (CPU) and is capable of providing the service, and wherein the physical computer characteristics associated with each physical computer include a location where each physical computer performs the service, a region specific to each physical computer in which each physical computer's data for the service is stored, a cost per megabyte (MB) of each physical computer's data for the service, and a percent utilization of each physical computer's CPU used for the service;

verifying, by the one or more processors, compliance with the legal compliance rules of the physical computer characteristics of each physical computer and of service definition attributes of the service, wherein said verifying comprises matching the legal compliance rules against the physical computer characteristics and the service definition attributes of the service and confirming that each physical computer characteristic and each service definition attribute of the service conforms to the legal compliance rules, wherein the service definition attributes include a value representing how often the data is backed up, an indicator denoting where disaster recovery of the data is provided, an indicator denoting a type of encryption that is used for the data that is confidential and is encrypted for protecting security of the confidential data, and an indicator denoting that long-term storage of the data is available and for how long, and wherein said verifying comprises verifying said compliance for only at least three physical computers of the plurality of physical computers;

returning, by the one or more processors from a result of said verifying, either said compliance or said non-compliance for each physical computer;

determining, by the one or more processors, a priority of each physical computer of the at least three physical computers whose compliance was verified, wherein the priority is based on an availability of the data for each physical computer of the at least three physical computers;

selecting, by the one or more processors from the at least three physical computers whose compliance was verified, a first physical computer to provide the service, wherein said selecting the first physical computer is based on the first physical computer having been determined to have a highest priority from among the priorities determined for each physical computer of the at least three physical computers, and wherein said verifying compliance for the first physical computer provides assurance that the data will be kept and serviced by the first physical computer in a compliant manner according to the legal compliance rules;

after initiation of the service running on the first physical computer, determining, by the one or more processors, that the first physical computer no longer comprises said compliance pertaining to encryption of the confidential data;

in response to said determining that the first physical computer no longer comprises said compliance, selecting, by the one or more processors, a second physical computer whose compliance was verified and currently prevails, wherein the verified compliance by the second physical computer includes said compliance pertaining to encryption of the confidential data, wherein said selecting the second physical computer is based on the second physical computer having been determined to have a highest priority from among the priorities determined for each remaining physical computer whose compliance was verified and currently prevails;

migrating, by the one or more processors, the confidential data from the first computer to the second computer, said confidential data being used for running the service on the first computer, said confidential data being no longer compliant on the first computer with respect to encryption of the confidential data;

confirming that a migration of the service from the first physical computer to the second physical computer complies with a specified limit on a number of times that the service may be migrated in a specified period of time to prevent excessive and disruptive migration of the service;

after said confirming, migrating, by the one or more processors, the service currently running on the first physical computer to running the service on the second physical computer using the migrated confidential data that is compliant on the second computer;

after said migrating the confidential data and the service, running the service on the second computer using the migrated confidential data.

2. The method of claim 1, wherein the availability of the data pertains to volume of the data, a processing time for processing the data, and a network bandwidth for transmitting the data.

3. The method of claim 1, wherein the computer system comprises a special purpose computer in which a read-only memory (ROM) is hard-wired, wherein the ROM contains program code, which, upon being executed by the one or more processors, implements the method, and wherein the special purpose computer is specific to the method due to the ROM being hard wired in the special purpose computer.

4. The method of claim 1, said method further comprising:
converting the legal compliance rules into a single conditional expression comprising a first constraint on where each physical computer is required to provide the service and a second constraint on where the data is required to be stored,
wherein said verifying comprises verifying the compliance or non-compliance of the single conditional expression with the physical computer characteristics of each physical computer and the service definition attributes.

5. The method of claim 4, wherein the first constraint is that each physical computer is required to provide the service at either a first location or a second location that differs from the first location, and wherein the second constraint is that the data is required to be stored at the first location.

6. The method of claim 5,
wherein the plurality of physical computers comprises the first physical computer, a second physical computer, and a third physical computer,
wherein the first physical computer performs the service at the first location for data stored at the first location so that the first physical computer is compliant with the legal compliance rules,
wherein the second physical computer performs the service at the first location for data stored at a third location that differs from the first location and the second location so that the second physical computer is non-compliant with the legal compliance rules, and
wherein the third physical computer performs the service at the second location for data stored at the first location so that the third is compliant with the legal compliance rules.

7. A computer program product, comprising one or more computer readable hardware storage devices having computer readable program code stored therein, said program code containing instructions executable by one or more processors of a computer system to implement a method, said method comprising:
identifying, by the one or more processors, a set of at least two legal compliance rules imposed by a government and associated with a service that uses and stores data, wherein the legal compliance rules include a type and format of the data, a physical locality within a legal jurisdiction relevant to security rules for the data, how long the data needs to be kept, whether or not the data needs to be encrypted, and what individuals, organizations or authorities are permitted access to the data and under what circumstances, identifying, by the one or more processors, a plurality of physical computers with associated physical computer characteristics, wherein each physical computer comprises a central processing unit (CPU) and is capable of providing the service, and wherein the physical computer characteristics associated with each physical computer include a location where each physical computer performs the service, a region specific to each physical computer in which each physical computer's data for the service is stored, a cost per megabyte (MB) of each physical computer's data for the service, and a percent utilization of each physical computer's CPU used for the service;

verifying, by the one or more processors, compliance with the legal compliance rules of the physical computer characteristics of each physical computer and of service definition attributes of the service, wherein said verifying comprises matching the legal compliance rules against the physical computer characteristics and the service definition attributes of the service and confirming that each physical computer characteristic and each service definition attribute of the service conforms to the legal compliance rules, wherein the service definition attributes include a value representing how often the data is backed up, an indicator denoting where disaster recovery of the data is provided, an indicator denoting a type of encryption that is used for the data that is confidential and is encrypted for protecting security of the confidential data, and an indicator denoting that long-term storage of the data is available and for how long, and wherein said verifying comprises verifying said compliance for only at least three physical computers of the plurality of physical computers;

returning, by the one or more processors from a result of said verifying, either said compliance or said non-compliance for each physical computer;

determining, by the one or more processors, a priority of each physical computer of the at least three physical computers whose compliance was verified, wherein the priority is based on an availability of the data for each physical computer of the at least three physical computers;

selecting, by the one or more processors from the at least three physical computers whose compliance was verified, a first physical computer to provide the service, wherein said selecting the first physical computer is based on the first physical computer having been determined to have a highest priority from among the priorities determined for each physical computer of the at least three physical computers, and wherein said verifying compliance for the first physical computer provides assurance that the data will be kept and serviced by the first physical computer in a compliant manner according to the legal compliance rules;

after initiation of the service running on the first physical computer, determining, by the one or more processors, that the first physical computer no longer comprises said compliance pertaining to encryption of the confidential data;

in response to said determining that the first physical computer no longer comprises said compliance, selecting, by the one or more processors, a second physical computer whose compliance was verified and currently prevails, wherein the verified compliance by the second physical computer includes said compliance pertaining to encryption of the confidential data, wherein said selecting the second physical computer is based on the second physical computer having been determined to have a highest priority from among the priorities determined for each remaining physical computer whose compliance was verified and currently prevails;

migrating, by the one or more processors, the confidential data from the first computer to the second computer, said confidential data being used for running the service on the first computer, said confidential data being no longer compliant on the first computer with respect to encryption of the confidential data;

confirming that a migration of the service from the first physical computer to the second physical computer complies with a specified limit on a number of times that the service may be migrated in a specified period of time to prevent excessive and disruptive migration of the service;

after said confirming, migrating, by the one or more processors, the service currently running on the first physical computer to running the service on the second physical computer using the migrated confidential data that is compliant on the second computer;

after said migrating the confidential data and the service, running the service on the second computer using the migrated confidential data.

8. The computer program product of claim 7, wherein the availability of the data pertains to volume of the data, a processing time for processing the data, and a network bandwidth for transmitting the data.

9. The computer program product of claim 7, wherein the computer system comprises a special purpose computer in which a read-only memory (ROM) is hard-wired, wherein the ROM contains program code, which, upon being executed by the one or more processors, implements the method, and wherein the special purpose computer is specific to the method due to the ROM being hard wired in the special purpose computer.

10. The computer program product of claim 7, said method further comprising:

converting the legal compliance rules into a single conditional expression comprising a first constraint on where each physical computer is required to provide the service and a second constraint on where the data is required to be stored, wherein said verifying comprises verifying the compliance or non-compliance of the single conditional expression with the physical computer characteristics of each physical computer and the service definition attributes.

11. The computer program product of claim 10, wherein the first constraint is that each physical computer is required to provide the service at either a first location or a second location that differs from the first location, and wherein the second constraint is that the data is required to be stored at the first location.

12. The computer program product of claim 11, wherein the plurality of physical computers comprises the first physical computer, a second physical computer, and a third physical computer, wherein the first physical computer performs the service at the first location for data stored at the first location so that the first physical computer is compliant with the legal compliance rules, wherein the second physical computer performs the service at the first location for data stored at a third location that differs from the first location and the second location so that the second physical computer is non-compliant with the legal compliance rules, and
wherein the third physical computer performs the service at the second location for data stored at the first location so that the third is compliant with the legal compliance rules.

13. A computer system, comprising one or more processors, one or more memories, and one or more computer readable hardware storage devices, said one or more hardware storage device containing program code executable by the one or more processors via the one or more memories to implement a method, said method comprising:
   identifying, by the one or more processors, a set of at least two legal compliance rules imposed by a government and associated with a service that uses and stores data, wherein the legal compliance rules include a type and format of the data, a physical locality within a legal jurisdiction relevant to security rules for the data, how long the data needs to be kept, whether or not the data needs to be encrypted, and what individuals, organizations or authorities are permitted access to the data and under what circumstances;
   identifying, by the one or more processors, a plurality of physical computers with associated physical computer characteristics, wherein each physical computer comprises a central processing unit (CPU) and is capable of providing the service, and wherein the physical computer characteristics associated with each physical computer include a location where each physical computer performs the service, a region specific to each physical computer in which each physical computer's data for the service is stored, a cost per megabyte (MB) of each physical computer's data for the service, and a percent utilization of each physical computer's CPU used for the service;
   verifying, by the one or more processors, compliance with the legal compliance rules of the physical computer characteristics of each physical computer and of service definition attributes of the service, wherein said verifying comprises matching the legal compliance rules against the physical computer characteristics and the service definition attributes of the service and confirming that each physical computer characteristic and each service definition attribute of the service conforms to the legal compliance rules, wherein the service definition attributes include a value representing how often the data is backed up, an indicator denoting where disaster recovery of the data is provided, an indicator denoting a type of encryption that is used for the data that is confidential and is encrypted for protecting security of the confidential data, and an indicator denoting that long-term storage of the data is available and for how long, and wherein said verifying comprises verifying said compliance for only at least three physical computers of the plurality of physical computers;
   returning, by the one or more processors from a result of said verifying, either said compliance or said non-compliance for each physical computer;
   determining, by the one or more processors, a priority of each physical computer of the at least three physical computers whose compliance was verified, wherein the priority is based on an availability of the data for each physical computer of the at least three physical computers;
   selecting, by the one or more processors from the at least three physical computers whose compliance was verified, a first physical computer to provide the service, wherein said selecting the first physical computer is based on the first physical computer having been determined to have a highest priority from among the priorities determined for each physical computer of the at least three physical computers, and wherein said verifying compliance for the first physical computer provides assurance that the data will be kept and serviced by the first physical computer in a compliant manner according to the legal compliance rules;
   after initiation of the service running on the first physical computer, determining, by the one or more processors, that the first physical computer no longer comprises said compliance pertaining to encryption of the confidential data;
   in response to said determining that the first physical computer no longer comprises said compliance, selecting, by the one or more processors, a second physical computer whose compliance was verified and currently prevails, wherein the verified compliance by the second physical computer includes said compliance pertaining to encryption of the confidential data, wherein said selecting the second physical computer is based on the second physical computer having been determined to have a highest priority from among the priorities determined for each remaining physical computer whose compliance was verified and currently prevails;
   migrating, by the one or more processors, the confidential data from the first computer to the second computer, said confidential data being used for running the service on the first computer, said confidential data being no longer compliant on the first computer with respect to encryption of the confidential data;
   confirming that a migration of the service from the first physical computer to the second physical computer complies with a specified limit on a number of times that the service may be migrated in a specified period of time to prevent excessive and disruptive migration of the service;
   after said confirming, migrating, by the one or more processors, the service currently running on the first physical computer to running the service on the second physical computer using the migrated confidential data that is compliant on the second computer;
   after said migrating the confidential data and the service, running the service on the second computer using the migrated confidential data.

14. The computer system of claim 13, wherein the availability of the data pertains to volume of the data, a processing time for processing the data, and a network bandwidth for transmitting the data.

15. The computer system of claim 13, wherein the computer system comprises a special purpose computer in which a read-only memory (ROM) is hard-wired, wherein the ROM contains program code, which, upon being executed by the one or more processors, implements the method, and wherein the special purpose computer is specific to the method due to the ROM being hard wired in the special purpose computer.

16. The computer system of claim 13, said method further comprising:
   converting the legal compliance rules into a single conditional expression comprising a first constraint on where each physical computer is required to provide the service and a second constraint on where the data is required to be stored, wherein said verifying comprises verifying the compliance or non-compliance of the single conditional expression with the physical computer characteristics of each physical computer and the service definition attributes.

17. The computer system of claim 16, wherein the first constraint is that each physical computer is required to provide the service at either a first location or a second location that differs from the first location, and wherein the second constraint is that the data is required to be stored at the first location.

* * * * *